United States Patent [19]

Claxton et al.

[11] 4,004,272
[45] Jan. 18, 1977

[54] OPTICAL PRESSURE SWITCH

[75] Inventors: William Eugene Claxton, Mogadore; Bruce Milan Cernik, Medina, both of Ohio

[73] Assignee: The Firestone Tire & Rubber Company, Akron, Ohio

[22] Filed: July 21, 1975

[21] Appl. No.: 597,809

[52] U.S. Cl. .................................. 340/58; 73/406; 200/61.25; 250/231 R
[51] Int. Cl.² .................. B60C 23/04; G01D 5/34
[58] Field of Search ....... 340/58; 200/61.22, 61.25; 250/231 R, 231 P; 73/406, DIG. 11; 356/253, 255

[56] References Cited
UNITED STATES PATENTS

| 2,142,602 | 1/1939 | Blethen | 250/231 R |
| 2,197,514 | 4/1940 | Barnes | 250/231 R |
| 3,067,617 | 12/1962 | Buck | 73/411 |
| 3,191,440 | 6/1965 | Miller | 73/398 |
| 3,240,946 | 3/1966 | Triplett | 250/231 R |

FOREIGN PATENTS OR APPLICATIONS 914,826  7/1954  Germany .............. 340/58

Primary Examiner—John W. Caldwell
Assistant Examiner—Joseph E. Nowicki

[57] ABSTRACT

A device for providing an optical indication of the pressure condition in a pressurized member, such as a pneumatic tire. A housing having a window therein carries a reflective surface, such as a mirror, which is mounted on a movable flap. One end of a plunger pin holds the mirror in alignment with the window with the other end of the pin resting on a diaphragm assembly which communicates with the internal pressure of the member. Light from a light source is directed in the window and under normal pressure conditions will be reflected by the mirror. If the internal pressure of the member drops below a predetermined value, the diaphragm will retract dropping the pin thereby moving the mirror out of alignment with the light source. The absence of reflected light is thus indicative of a low pressure condition and corrective measures can be taken.

6 Claims, 2 Drawing Figures

OPTICAL PRESSURE SWITCH

BACKGROUND OF THE INVENTION

This invention relates to an apparatus for providing an optical indication of the pressure condition of a pressurized member. More particularly, in its preferred form, this invention relates to a device which will provide a light when the pressurized member is at a tolerable pressure and no light when the pressure falls below a predetermined value. The absence of light can then be used to activate electronic circuitry to provide an alert of the low pressure condition.

It is often important to know the internal pressure of a pressurized member and particularly to insure that the pressure does not fall below tolerance levels. A typical example is the pneumatic tire where the undetected low pressure condition is not only a hazard to the safe operation of the vehicle but also can be detrimental to the tire itself.

Many types of devices have been detected for monitoring the pressure condition of an inflatable member such as a tire. Some, like a permanently mounted pressure gauge, merely give a contant reading of pressure requiring one to periodically observe the status of the pressure. In other systems a low pressure condition actuates a transmitter with the receiver in the vehicle sounding to alert the operator of the vehicle of the low pressure condition. Similarly, ultrasonic devices have been employed to indicate a low pressure condition. But both the transmitter-receiver system and the ultrasonic system are subject to system failure and/or spurious activation and have therefore been considered inadequate.

At times a light source has been used to indicate a pressure problem. For example, each tire of a vehicle has been equipped with a battery to operate a light source which was activated when a low pressure condition existed. Such a system required a battery at each wheel or else the use of slip rings to connect the rotating light source to the battery of the vehicle. The light was used with electronic circuitry to warn the vehicle operator of a problem but because it was only operable under low pressure conditions, the operator of the vehicle had no way to test the optical system to assure himself that it was working properly.

SUMMARY OF THE INVENTION

It is therefore a primary object of the present invention to provide an optical indication of the pressure condition of a pressurized member.

It is another object of the present invention to provide a device, as above, which is readily adaptable to monitor the internal pressure of a rotating tire.

It is a further object of the present invention to provide a device, as above, which can be used with a rotating tire on a vehicle without requiring a separate power source at each wheel and without requiring slip ring connections.

It is still another object of the present invention to provide a device, as above, which can readily activate an electronic alarm circuitry upon the detection of a low pressure condition.

It is yet another object of the present invention to provide a device, as above, which is failsafe and fully testable when used in conjunction with an electronic alarm circuitry.

It is a still further object of the present invention to provide a device, as above, which is relatively inexpensive to manufacture and immune from false indications of a low pressure condition.

These and other objects of the present invention, which will become apparent from the description of the preferred embodiment, are accomplished by the means hereinafter described and claimed.

In general, the device for giving an optical indication of the pressure condition of a pressurized member includes a housing having a window therein. A reflective surface is movably mounted in the housing so that it can be aligned or misaligned with a light source directed toward the window. An actuator communicates with the internal pressure of the member allows the reflective surface to move from the aligned to misaligned position upon a change in the internal pressure of the member.

DESCRIPTION OF THE PREFERRED EMBODIMENT

Figure 1:
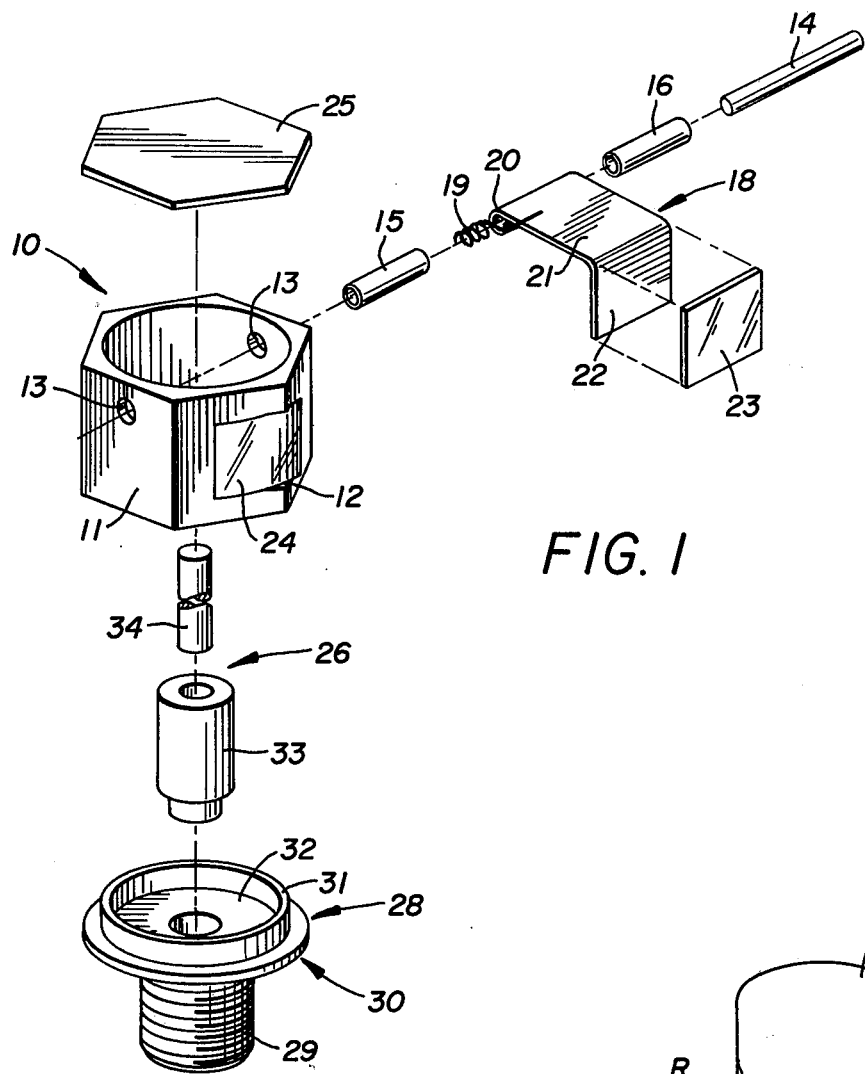
FIG. 1 is an exploded view of the optical pressure switch according to the concept of the present invention.

The optical pressure switch according to the preferred form of the present invention is indicated generally by the numeral 10 and includes a housing 11 which is shown as having a hexagonal outer surface but which could be of any desired configuration. A window 12 can be conveniently provided through housing 11 by merely cutting of one of the corners of the hexagonal outer surface. Housing 11 is also provided with two diametrically opposed bores 13 which receive a pin 14 therethrough. Pin 14 carries two bushings 15 and 16, an angular flap 18 and a spring 19. Angular flap 18 includes a cylindrical base portion 20, a tension bearing surface 21 and a mounting surface 22 angular to surface 21 at an angle of approximately 90°. Pin 14 is slidably received through bushings 15 and 16, through portion 20 of flap 18 and through spring 19 with each end of pin 14 being affixed in bores 13 of housing 11. A reflective surface, such as a mirror 23, is affixed to mounting surface 22 of flap 18. Pin 14 is mounted in housing 11 such that the mirror 23 will be movable from a position aligned with window 12 to a position misaligned with the window. A protective transparent material such as glass 24 can be mounted in window 12 to protect mirror 23. A cover plate 25 can be utilized to close the top of housing 11.

Considering the structure just described, mirror 23 will be urged downward, that is, misaligned with window 12 by spring 19. In order to maintain mirror 23 aligned with window 12, an actuator assembly, indicated generally by the numeral 26 is provided. Actuator assembly 26 includes a conventional diaphragm assembly 28 such as can be purchased from Texas Instruments, Inc. of Dallas, Tex. and carrying Model No. 20PS001KB0ZKC014Z. Diaphragm assembly 28 includes a stem 29 which can be threaded into the pressurized member to thereby communicate with the internal pressure thereof. Mounted on top of stem 29 is a disk 30 having an annular rim 31. The bottom of housing 11 fits around rim 31 and is affixed to disk 30. Within annular rim 31 is a diaphragm 32 which can be any type of flexible material which expands and contracts according to a preselected internal pressure of the pressurized member.

Actuator assembly 26 also includes a bushing 33 which is affixed to diaphragm 32 and a plunger pin 34 which is dropped within bushing 33 thereby resting on diaphragm 32. The top of pin 34 extends into housing 11 and bears against surface 21 of flap 18. Under normal or tolerable pressure conditions, the internal pressure against diaphragm 32 is transmitted through pin 34 to overcome the bias of spring 19 and hold mirror 22 aligned with window 12. Under these conditions, surface 21 of flap 18 is generally horizontal while surface 22 of flaP 18 is generally vertical. In the event the internal pressure falls below a predetermined value as determined by the selection of diaphragm assembly 28, pin 34 will move downward permitting the bias of spring 19 to rotate flap 18 on pin 14 downward causing mirror 23 to become misaligned with window 12 of housing 11.

Figure 2:
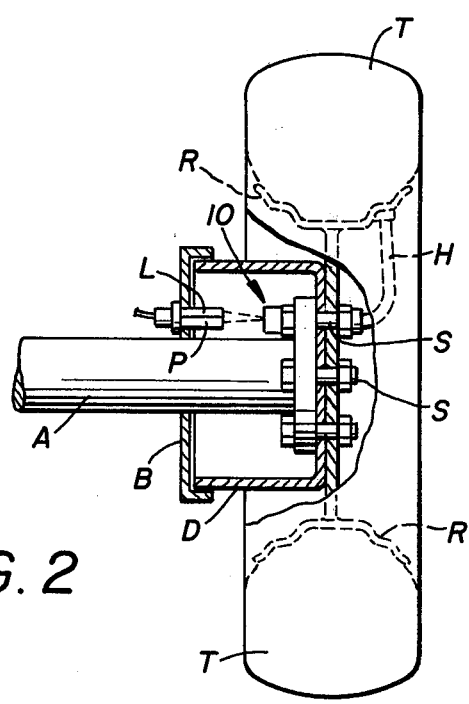
FIG. 2 is a schematic view showing the optical pressure switch as it could be used in the environment of monitoring the pressure of a pneumatic tire on a vehicle.

One manner in which the optical pressure switch 10 can be readily utilized is in conjunction with the tires on a vehicle. Such usage is schematically shown in FIG. 2. There switch 10 is shown as being mounted near the head of a wheel stud S and communicating with the internal pressure of a tire T through a flexible hose connection H. It should be evident that switch 10 could be mounted directly on the rim R, if desired, to communicate with the internal pressure. Mounted on a stationary portion of the vehicle is a light source L and a sensing device preferably in the form of a conventional photo-transistor P. As shown, light source L and photo-transistor P are mounted within the brake drum D in a backing plate B which is rigidly attached to housing of the axle A. In this matter the light source and photo-transistor as well as the switch 10 are protected from dirt and the like by the confinement within the brake drum and backing plate. Light source L can receive its power from the battery of the vehicle and its light is directed through window 12 of housing 11. If mirror 23 is aligned indicating a tolerable pressure level in tire T, the light will be reflected to photo-transistor P once each revolution of the tire. The absence of a light pulse, indicative that the pressure is below the preselected value, will also be sensed by the photo-transistor. Photo-transistor P can then be used to activate electronic circuitry (not shown) which can alert the operator of the vehicle as to which tire is suffering the low pressure condition. Typical of the type of electronic circuitry which could be employed for this purpose is found in the application of one of the co-inventors herein, William E. Claxton, application Ser. No. 581,392 filed May 27, 1975, owned by the assignee of the invention herein, to which reference is made for such details as may be necessary to understand one usage of the switch 10 disclosed herein.

It should thus be evident that the device described herein can monitor the pressure of a pressurized member and provide an optical indication thereof thereby accomplishing the objects of the present invention and substantially improving the art.

We claim:

1. Apparatus for giving an optical indication of the internal pressure condition of a pressurized member comprising a housing having a window therein; an angular member movably mounted within said housing, said angular member having a first portion angular to a second portion; reflecting means mounted on said second portion of said angular member; pin means suspending said angular member in said housing so that said reflecting means is movable from one position, aligned with the window to receive light from a remote light source and reflect the same through the window, to another position misaligned with the window and the light from the remote source; actuator means supporting said first portion of said angular member and communicating with the internal pressure of the pressurized member to allow said reflecting means to move from said one position to said another position dependent upon the internal pressure of the pressurized member; and biasing means carried by said pin means and contacting said first portion of said angular member to urge said first portion toward said actuator means.

2. Apparatus according to claim 1 wherein said actuator means includes a diaphragm movable in response to the internal pressure of the pressurized member and means resting on said diaphragm and moving said reflecting means in response to the movement of said diaphragm.

3. Apparatus according to claim 1 wherein said actuator means includes a diaphragm movable in response to the internal pressure of the pressurized member and means having one end resting on said diaphragm and the other end supporting said first portion of said angular member against the urging of said biasing means.

4. Apparatus according to claim 1 wherein said pressurized member is a tire on a vehicle, the remote light source being fixed to a stationary portion of the vehicle so that light emitted therefrom is directed through the window, and further comprising sensing means mounted on a stationary portion of the vehicle in a position to receive light from said light source as reflected by said reflecting means.

5. Apparatus according to claim 1 further comprising a cover for said housing and a transparent material over the window of said housing.

6. Apparatus according to claim 1 wherein said actuator means maintains said reflecting means in said one position under normal pressure conditions and allows said reflecting means to move to said another position when the internal pressure falls below a predetermined value.

* * * * *